L. S. CONNOR.
Seed-Planters.

No. 155,929.  Patented Oct. 13, 1874.

WITNESSES:
G. Matthys.
Goeon Kenon

INVENTOR:
L. S. Connor
BY
ATTORNEYS.

UNITED STATES PATENT OFFICE.

LAWRENCE S. CONNOR, OF ORANGEBURG, SOUTH CAROLINA.

IMPROVEMENT IN SEED-PLANTERS.

Specification forming part of Letters Patent No. 155,929, dated October 13, 1874; application filed July 6, 1874.

*To all whom it may concern:*

Be it known that I, LAWRENCE S. CONNOR, of the city and county of Orangeburg and State of South Carolina, have invented a new and Improved Seed-Planter; and I do hereby declare that the following is a full, clear, and exact description of the same, reference being had to the accompanying drawing, forming a part of this specification, in which—

Figure 1:
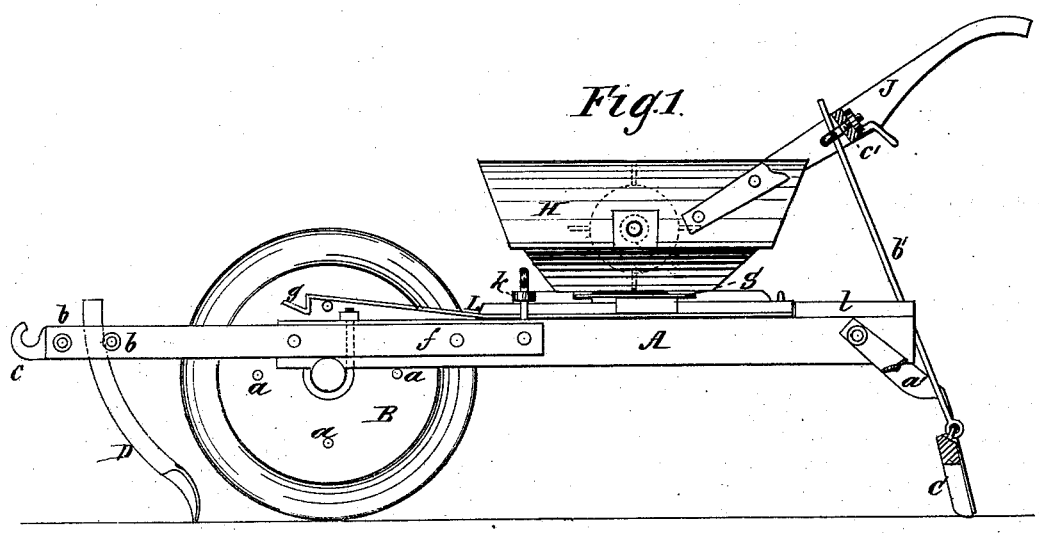
Figure 2:
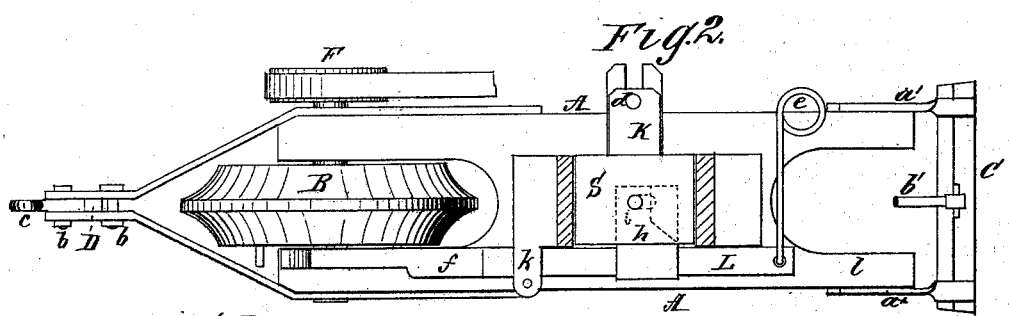
Figure 5:
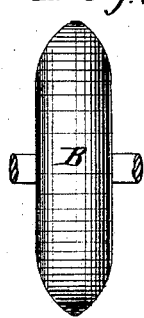
Figure 3:
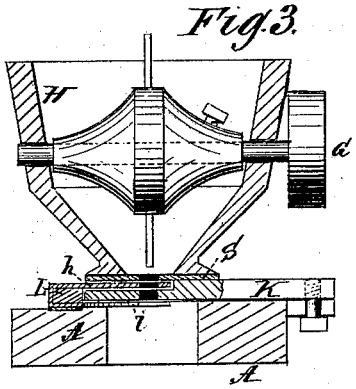
Figure 4:
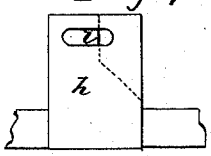

Figure 1 is a side elevation; Fig. 2, a plan view; Fig. 3, transverse section through the feed-box; Fig. 4, detail view of slide and plates; Fig. 5, modification of the furrow-wheel.

This invention relates to that class of agricultural implements which are called seed-planters; and consists in a new and improved arrangement of parts whereby the operation of seed-planting is facilitated.

In the drawing, A represents the bed-frame of the planter, supported at one end by the furrow-wheel B and at the other by the coverer C. Said wheel B is of large size, heavy and tapered to a narrow periphery when seed are to be drilled close, and to a broad round surface when they are intended to be scattered, and is used for the purpose of running in a furrow and breaking the clods before the seed are deposited. Said wheel has upon its side the projecting stems $a$, which, as the wheel revolves, operate a vibrating slat. D is the plow or opener which runs the furrow. It is fastened in the frame A, and is made with a curved leg to admit of its being placed near the wheel, and can be adjusted to run a deep or shallow furrow. Said leg is held between the bolts $b\ b$, pivoted upon one of which is the draw-hook $c$, which is intended to receive a single-tree. F is a pulley keyed upon the shaft of wheel B, and connecting, by a band, with a second pulley, G, attached to a shaft in grain-box H, which is provided with spikes to form a stirrer. Said grain-box is supported upon the bed-frame, and has attached to its sides the handles J. Underneath the grain-box is an adjustable feed-slide, K, which is attached to the sliding bottom S of the grain-box, and provided with a hole that is held directly beneath the hole in the said plate S by a set-screw, $d$. Said plate and slide are duplicated, and the duplicates have each different-sized holes graduated to suit the flow of different kinds of seeds. L is a vibrating slat, having at one end the coil-spring $e$, and at the other a flat spring, $f$, bent, at $g$, into such a position that the stems $a$ hook in the same as the wheel B moves forward, but have no effect upon it when the wheel is reversed. About the middle of slat L is attached two thin plates, $h$ and $i$, which move one above the other below the feed-slide K. The top one, $h$, of these two plates is slotted, and they are both so placed that when the one at the top of the hole in feed-slide K covers the same the one at the bottom is withdrawn from it, and vice versa. The vibrating slat is kept in position upon the bed by guide $k$ and piece $l$, and may readily be taken off with the plates $h$ and $i$ by withdrawing the pin from the guide $k$ and removing the spring $e$. The coverer C is pivoted to the bed-frame A by pieces $a'$, and rendered adjustable in its inclination by the rod $b'$ and set-screw $c'$.

The operation of this seed-planter is as follows: The planter is first adapted to the seed by inserting plates S and K, having the proper-sized holes, and as the planter is drawn forward the plow makes the furrow, the wheel B presses it into the right shape, and the stems $a$ in their revolution raise slightly the spring $f$, hook in the catch $g$, and draw forward the slat L. The plate $h$ closes the hole in the bottom plate S, and the plate $i$ being, by the same action, withdrawn, the seed contained in the cup formed by the said plate $i$ and the hole in slide K are allowed to fall into the furrow. As soon as the stem has passed the catch in the spring $f$ the coil-spring draws back the vibratory slat, and the operation is repeated. The coverer C then fills up the furrow and presses the earth upon the seed, the compactness of the same being regulated by the inclination of the coverer, which is controlled by the rod $b'$ and set-screw $c'$.

To increase or decrease the delivery of the planter the stems $a$ may be correspondingly increased or diminished as the case may require.

Having thus described my invention, what I claim as new, and desire to secure by Letters Patent, is—

The combination of the detachable bottom S, detachable slide K, the vibrating slat L, plates $h$ and $i$, coil-spring $e$, and flat spring $f$, bent at $g$, as shown and described, or constructed and arranged substantially as specified.

LAWRENCE S. CONNOR.

Witnesses:
WM. V. IZLAR,
A. M. SALLEY.